United States Patent Office 3,579,486
Patented May 18, 1971

3,579,486
MALEATED POLYOLEFINS
Richard L. McConnnell and Frederick B. Joyner, Kingsport, Tenn., assignors to Eastman Kodak Company, Rochester, N.Y.
No Drawing. Filed Dec. 22, 1967, Ser. No. 692,703
Int. Cl. C08f *15/04, 27/04, 27/08*
U.S. Cl. 260—78.4                                 7 Claims

ABSTRACT OF THE DISCLOSURE

Normally available maleated polyolefins are improved by treating with a base to neutralize residues in the nature of maleic or fumaric acid; such bases include organic amines, metal hydroxides or metal alkoxides. The improved products have greater adhesion to paper, leather, fabrics, metal foils and other substrates, are generally free of toxic constituents and produce improved stereographic sheets and other coated objects.

---

This invention relates to new and improved maleated polyolefin products and processes for preparing such products.

The preparation of maleated polyolefins is known as well as various uses of such products as coating compositions. See copending U.S. application Ser. No. 502,437 filed on Oct. 22, 1965 by Joyner and McConnell now U.S. Pat. No. 3,480,580 issued on Nov. 25, 1969 which discloses a catalyzed process for maleating low-viscosity polyolefins such as low-viscosity polypropylene, propylene copolymers and the like. This disclosure is incorporated by reference into the present disclosure. See also copending U.S. patent application Ser. No. 643,872 filed on June 6, 1967 by Knowles and Winebarger which discloses a process and apparatus for maleating low molecular weight thermally degraded polyolefins including polyethylene using an agitated, multistage reaction zone under essentially plug-type flow conditions; also disclosed is a process for treating maleated polyolefins so as to eliminate noxious gases that may be formed when being used in a molten condition during melt coating, such treatment comprising striping in a thin film evaporator or the like. This disclosure is incorporated by reference into the present disclosure. Also incorporated by reference is copending U.S. patent application filed Nov. 27, 1967 by Brunson and Douglas, Ser. No. 685,957 which has been abandoned. It has been replaced by continuation-in-part Ser. No. 719,217, filed Apr. 5, 1968. Ser. No. 685,957 discloses flexible sheets (such as paper) having a three dimensional (3-D) appearance from a printed stereographic image coated with a hot melt coating composition having on its surface a lenticulated pattern, said coating composition being essentially (50–100%) composed of maleated polyethylene. About 5 to 45% of the coating composition may be a copolymer of ethylene and either an alkyl (1–8 carbons) acrylate or a vinyl alkanoate (1–8 carbons).

Although maleated polyolefins such as maleated polyethylene as presently known have advantageous properties and utility, there is a need for even greater adhesion, essentially complete elimination of toxic byproducts during utilization of melts over extended periods, and other improvements. Thus, when using maleated polyethylene as a hot melt adhesive for food cartons, there should be essentially no tendency to impart to the foods any significant amount of maleic acid, fumaric acid or maleic anhydride which may adversely affect the purity of the foods. Likewise, when coating a stereographically printed sheet there sould be no signficant accumulation of noxious vapors affecting the personnel performing the coating operation.

Moreover, other properties are in need of greater improvement such as adherence to the article or object being coated.

These and other factors are improved upon by the present invention.

According to one embodiment of this invention there is provided an improved maleated polyolefin having a melt viscosity in the range between about 1,000 and about 100,000 cp. at 150° C., having a saponification number between about 2 and about 50, the numerical value of said saponification number being essentially all accounted for by acid groups chemically associated with the polymeric molecules of said maleated polyolefin.

These improved products can be favorably compared with those produced according to the disclosure and claims of Knowles and Winebarger U.S. application Ser. No. 691,099 filed on Nov. 29, 1967, which is a continuation-in-part of their application Ser. No. 643,872, filed on June 6, 1967, wherein improved maleated polyethylene products or the like can be provided by a process comprising forming a thin film (about 1 to about 3 mm. thick) of maleated polyethylene having a melt viscosity in the range between 1,000 and about 100,000 cps. at 150° C. and heating said film at a temperature in the range between about 100° C., and about 250° C. at a pressure less than about 1 mm. of Hg pressure until said improved product is produced.

According to certain embodiments of this invention there are provided maleated polyolefin products containing as an in situ component from 0.0001% to about 0.5% of a hydrocarbon amine salt of maleic or fumaric acid, a metal salt of maleic or fumaric acid or mixtures thereof, said maleic or fumaric moieties including essentially all said moieties which are chemically unassociated with the polymeric molecules of said maleated polyethylene.

Thus, improved maleated polyolefins are provided wherein less than 0.2 unit of said saponification numerical value is accounted for by acid groups chemically unassociated with said polymeric molecules.

We have discovered that such an improved product can be provided by a process, according to an embodiment of this invention comprising incorporating a component into a maleated polyethylene having a saponification number between 3 and about 10 and having a melt viscosity in the range between about 1,000 and about 100,000 cp. at 150° C., said component being a hydrocarbon amine or a hydroxide or alkoxide of a metal of the first three groups of the Periodic Table of Elements, said alkoxide groups each containing from 1 to 8 carbon atoms.

Another aspect of our invention is the incorporation of said hydrocarbon amine, metal hydroxide or alkoxide component into a maleated polypropylene, maleated, poly-1-butene, maleated copolymer of propylene and 1-butene and the like having a saponification number of at least 6 and having a melt viscosity in the range of 100 to 5,000 cp. at 190° C.

The amount of said component employed in the maleated polyolefins is sufficient to achieve the results indicated and is generally in the range between about 0.1% and 5% by weight of said product.

Commercially available maleated polyethylene generally contains approximately 0.1% maleic anhydride, maleic acid, fumaric acid or mixtures thereof in a chemically unassociated state. Of course, higher or lower percentages may be present. Such a product, when in a molten form evolves small amounts of acid or anhydride vapors and causes irritation to the eyes and mucous membranes of operating personnel.

As already apparent from the above description, the objectionable (unassociated state) maleic or furmaric acid and/or maleic anhydride can be neutralized advantageously by the addition of certain basic materials such as amines and/or metal hydroxides and/or alkoxides. Suitable basic materials which may be used include tertiary hydrocarbon amines such as tributyl amine, trioctylamine, trilaurylamine, trioctadecylamine, triphenyl amine, etc., metal hydroxides and alkoxides such as aluminum hydroxide, aluminum, isopropoxide, aluminum isobutoxide, lithium butoxide, sodium methoxide, sodium ethoxide, sodium isobutoxide, calcium ethoxide, calcium hydroxide and the like.

Reactions of the amine and/or the metal hydroxide and/or alkoxide may be conducted in the melt phase in a stirred reactor or the material may be mixed in other conventional mixing equipment such as in Brabender equipment, Banbury mixers, on hot rolls or by other conventional means of mixing organic materials into polymeric materials. In general, the metal hydroxide, alkoxide or the amine is added in an amount sufficient to react only with the free maleic or fumaric acid or maleic anhydride present. However, it is not harmful if all of the acidic material including that which is chemically assciated with the polymeric molecules in the polymer is neutralized by the chemical additive. Suitable reaction temperatures for the neutralization include temperatures of the order of about 100° up to and including about 275° C. Reaction time is not critical as long as the chemical additive has an opportunity to react with the acidic groups in the polymer. Suitable reaction times are from about 30 sec. to about 40 minutes, or longer if desired.

This invention will be further illustrated by the following examples:

EXAMPLE I

A commercially available maleated polyethylene product is melted and has a melt viscosity at 190° C. of 4,000 cp., a saponification number of 4.66 and about 0.1% acid in the chemically unassociated state. Stereographically (3-D) printed pictures are coated and embossed as described in Brunson and Douglas U.S. patent application Ser. No. 685,957, filed on Nov. 27, 1967, the disclosure of which is incorporated herein by reference.

The maleated polyethylene product so coated is produced by a process as illustrated by the above cited Knowles and Winebarger U.S. patent applications wherein the product has not been processed so as to avoid irritating vapors during subsequent processing conditions.

The above-identified maleated polyethylene is held at a melt temperature of 150° C. for 1 hour and coated as described in the examples of the Brunson et al. application. During the coating operation ( melt temperature 150° C.), unpleasant fumes (maleic anhydride and/or maleic acid or fumaric acid) are evolved. These fumes have a sharp penetrating odor and cause choking as well as irritation of eyes and mucous membranes of operating personnel.

A portion of the above identfied maleated polyethylene having a saponification number of 4.66 is dissolved in hot xylene and is precipitated in acetone to remove the free maleic or fumaric acid and/or maleic anhydride from the gross product; the product then has a saponification number of 2.57.

The reduction (by extraction) in the value of the saponification number is a measure of the presence of acid groups not chemically associated with the polymeric molecules of the maleated polyethylene.

Although solvent extraction may be used to achieve some of the results otherwise achieved by the present invention, the following examples are preferred.

EXAMPLE II

Maleated polyethylene as identified in Example I having a saponification number of 4.66 is used in the amount of 50 grams. It is mixed with 0.573 gram of trioctylamine and placed in a 300 ml. three neck, round bottom flask. The mixture is melted under an atmosphere of nitrogen and maintained at 120°–130° C. with stirring for 1 hour. The product is white and it has a saponification number of 4.34. 3-D pictures are successfully coated with this product and no objectionable fumes are observed when this material was heated at 150° C. for more than 1 hour. Paraffin wax containing 10% of this product is an effective hot melt adhesive and no objectionable fumes are observed when it is used to seal cardboard cartons.

Similarly good results are obtained when 0.73 g. of trioctylamine or an equivalent amount of tributylamine, trilaurylamine, trioctadecylamine, triphenylamine or tri-2-ethylhexylamine are used.

EXAMPLE III

The process of Example II is repeated using 0.66 g. of aluminum isopropoxide instead of the trioctylamine. The product was white. It had saponification numbers of 4.45 and 3.12 before and after extraction. Fumes from the product are not objectionable when heated at 150° C. for over 1 hour.

Similarly good results are obtained when 0.33 g. of aluminum isopropoxide is used. In this example, saponification numbers of 4.56 and 3.65 are obtained before and after extraction. Similarly good results are obtained when an equimolar amount of sodium isobutoxide, sodium ethoxide, sodium methoxide, or potassium butoxide is used.

EXAMPLE IV

Maleated polypropylene (38.7 g.) having a saponfication number of 35.1 and a melt viscosity of 380 cp. at 190° C. is treated with aluminum isopropoxide (1.3 g.) in a Brabender Plastograph at 175° C. for 6 minutes. The melt is maintained under a nitrogen atmosphere during the mixing operation. No objectionable fumes are evolved when the melt is heated at 200° C. for a period of 1 hour.

Similarly good results are achieved when maleated polypropylene having a saponification number of 22.6 and a melt viscosity of 4900 cp. at 190° C. is treated with aluminum isopropoxide, potassium isobutoxide, calcium hydroxide, or tridecylamine.

EXAMPLE V

A meleated copolymer (39.7 g.) of 60% propylene and 40% 1-butene having a saponification number of 9.6 and a melt viscosity of 2700 cp. at 190° C. is treated with aluminum isopropoxide (0.32 g.) according to the procedure of Example IV except that the reaction temperature is 125° C. The white product does not evolve objectionable fumes when the melt is heated at 150° C. for 2 hours.

Similarly good results are achieved when the propylene/1-butene copolymer is treated with sodium methoxide or trihexylamine.

EXAMPLE VI

Meleated poly-1-butene (39.5 g.) having a saponification number of 13.7 and a melt viscosity of 5,000 cp. at 190° C. is treated with aluminum isobutoxide (0.5 g.) according to the procedure of Example IV. The white product does not evolve objectionable fumes when the melt is heated at 150° C. for 2 hours.

Similarly good results are achieved when the poly-1-butene is treated with sodium methoxide, triphenylamine, or trioctylamine.

The improved products of this invention have greater adhesion to paper, leather, fabrics, metal foils and other substrates, are generally free of toxic constituents and produce improved stereographic sheets as well as other coated objects.

The invention has been described in detail with particular reference to preferred embodiments thereof, but it will be understood that variations and modifications can be effected within the spirit and scope of the invention as described hereinabove and as defined in the appended claims.

We claim:

1. Improved meleated polyolefin composition having a saponfication number between about 2 and about 50, the numerical value of said saponification number being essentially all accounted for by acid moieties chemically associated with the polymeric moecules of said maleated polyolefin, said composition having a melt viscosity in the range between about 1,000 and about 100,000 cps. at 150° C., said composition containing as an in situ component from 0.0001% to about .5% by weight of a hydrocarbon amine salt of maleic or fumaric acid, a metal salt of maleic or fumaric acid, or mixtures thereof, the moieties of said maleic or fumaric acid in said salt or salts including essentially all said moieties which are chemically unassociated with the polymeric molecules of said maleated polyolefin, said metal being of the first three groups of the Periodic Table of Elements, and said composition being characterized by greater adhesion to paper, leather, fabric or metal foils due to the presence of said in situ component.

2. Maleated compositions as defined by claim 1 wherein the polyolefin is polyethylene and said saponification number is between 3 and about 1.

3. Maleated composition as defined by claim 2 wherein said component is a trioctylamine salt of maleic or fumaric acid, or a mixture thereof.

4. Maleated composition as defined by claim 2 wherein said component is a tri-2-ethylhexylamine salt of maleic or fumaric acid or a mixture thereof.

5. Maleated composition as defined by claim 2 wherein said component is a trilaurylamine salt of maleic or fumaric acid or a mixture thereof.

6. Maleated composition as defined by claim 2 wherein said component is an aluminum maleate or fumarate or mixtures thereof.

7. Maleated composition as defined by claim 1 wherein the polyolefin is polypropylene, poly-1-butene or a copolymer of propylene and 1-butene, said saponification number is at least 6, and said melt viscosity is in the range of 100 to 5,000 cps. at 190° C.

References Cited

UNITED STATES PATENTS

| | | | |
|---|---|---|---|
| 2,662,874 | 12/1953 | Brown | 260—79.5 |
| 3,322,734 | 5/1967 | Rees | 260—79.3 |
| 2,973,344 | 2/1961 | Fasce | 260—78.4 |
| 3,290,415 | 12/1966 | Tanner | 260—878 |
| 3,299,029 | 1/1967 | Binsbergen et al. | 260—94.9G |
| 3,433,777 | 3/1969 | Brunson | 260—88.2 |

JOSEPH L. SCHOFER, Primary Examiner

J. KIGHT III, Assistant Examiner

U.S. Cl. X.R.

117—127, 142, 155, 161; 260—78.5

PO-1050
(5/69)

UNITED STATES PATENT OFFICE
CERTIFICATE OF CORRECTION

Patent No. 3,579,486      Dated May 18, 1971

Inventor(s) Richard L. McConnell and Frederick B. Joyner

It is certified that error appears in the above-identified patent and that said Letters Patent are hereby corrected as shown below:

Column 1, line 3, "McConnnell" should read ---McConnell---.

Column 2, line 23, after the word "between" insert ---about---.

Column 3, line 6, delete the comma (,) between the words "titanium" and "isopropoxide".

Column 4, line 43, "meleated" should read ---maleated---.

Column 4, line 56, "meleated" should read ---maleated---.

Column 5, line 2, "meleated" should read ---maleated---.

Column 5, line 3, "saponfication" should read ---saponification---

Column 5, line 6, "moccules" should read ---molecules---.

Column 5, line 23, "1" should read ---10---.

Signed and sealed this 14th day of September 1971.

(SEAL)
Attest:

EDWARD M. FLETCHER, JR.
Attesting Officer

ROBERT GOTTSCHALK
Acting Commissioner of Patents